(No Model.) 2 Sheets—Sheet 1.
A. E. BROWN.
AUTOMATIC DUMP BUCKET.
No. 370,679. Patented Sept. 27, 1887.
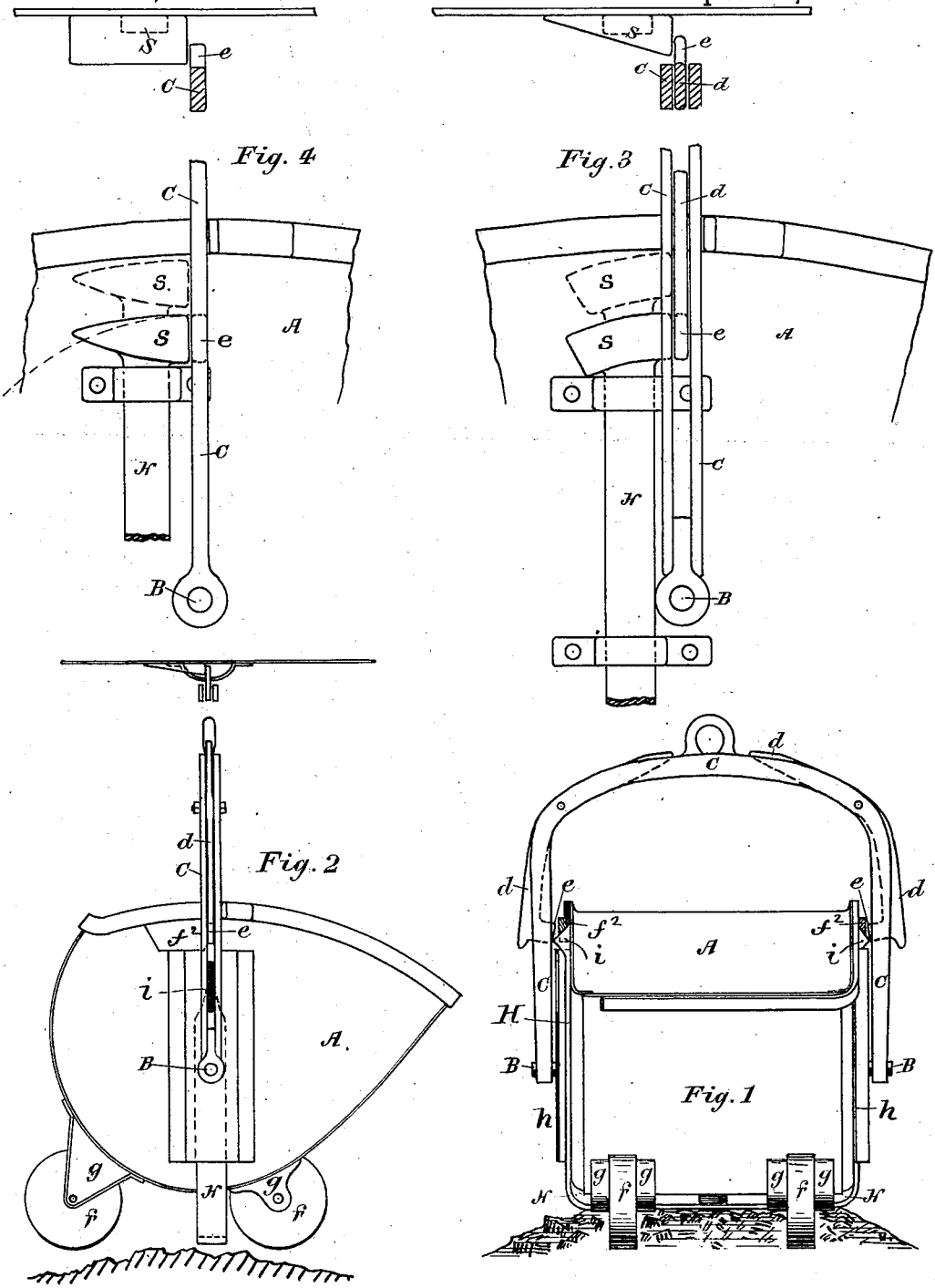
Witnesses.
W. J. Graham.
H. Hansen.
Inventor.
Alex. E. Brown.
By J. N. McIntire, Att'y.

(No Model.) 2 Sheets—Sheet 2.
A. E. BROWN.
AUTOMATIC DUMP BUCKET.
No. 370,679. Patented Sept. 27, 1887.
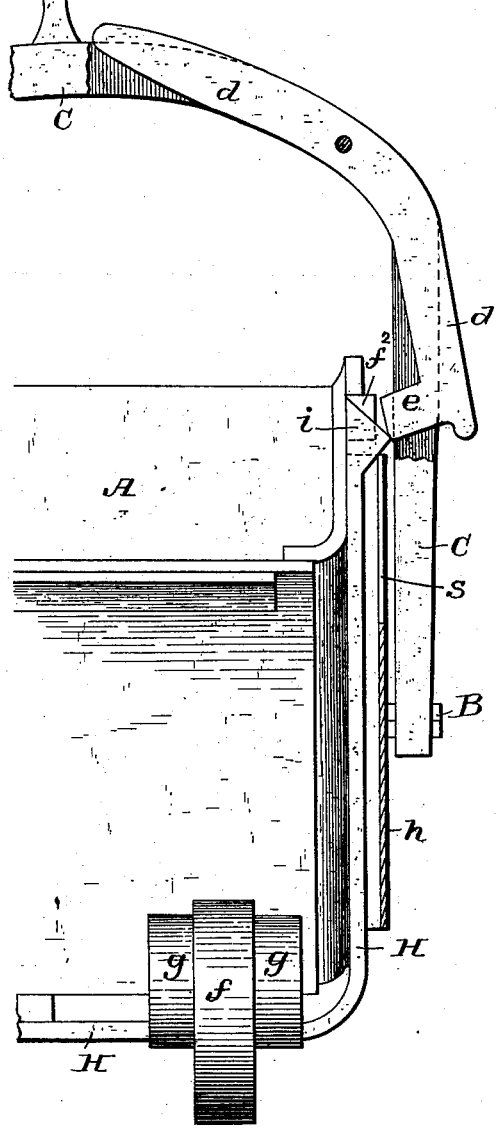
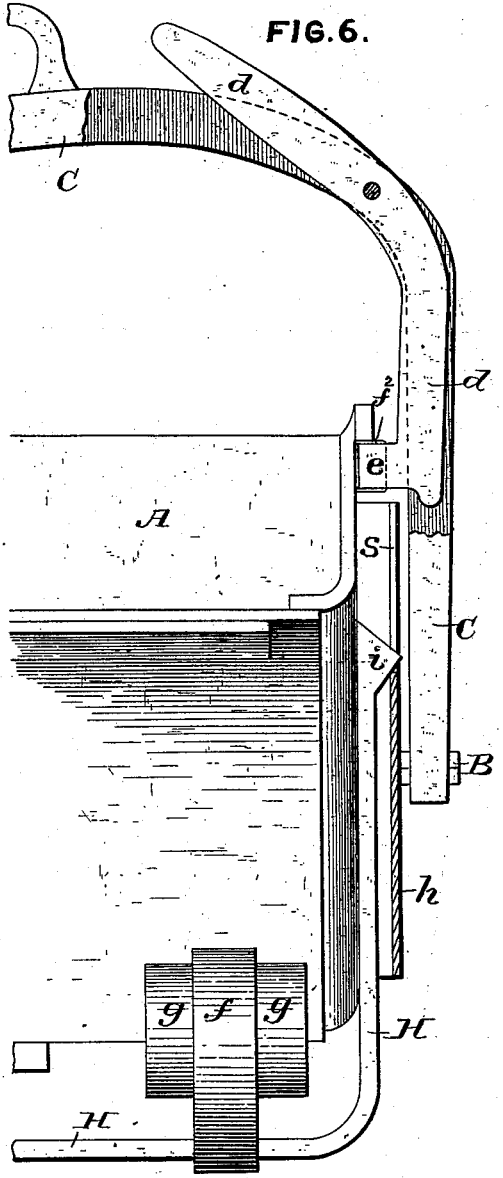
Witnesses
J. Henry Kaiser
Victor J. Evans.
Inventor
Alex. E. Brown
By his Attorney
J. N. McIntire

UNITED STATES PATENT OFFICE.

ALEXANDER E. BROWN, OF CLEVELAND, OHIO.

AUTOMATIC DUMP-BUCKET.

SPECIFICATION forming part of Letters Patent No. 370,679, dated September 27, 1887.

Application filed March 15, 1887. Serial No. 231,019. (No model.)

*To all whom it may concern:*

Be it known that I, ALEXANDER E. BROWN, of Cleveland, in the county of Cuyahoga and State of Ohio, have invented a new and useful Automatic Dump-Bucket for Hoisting and Conveying Machines; and I do hereby declare that the following is a full, clear, and exact description thereof, reference being had to the accompanying drawings, making part of this application.

My invention relates to the buckets which are usually employed in connection with hoisting and conveying machines in the handling of coal, ores, and other materials, and which, as is well known, are usually constructed in such a manner that the body portion or bucket proper is held, when filled, in the proper position relatively to the bail or handle by means of some sort of catch or locking mechanism which effects an engagement between the opposite sides of the bail and the corresponding sides of the bucket, there being some sort of means adapted to be operated either by hand or automatically for effecting the unlocking of the bucket from the bail, so that the former will rotate on its trunnions and automatically discharge its contents.

My invention consists in the novel combination of devices, which will be hereinafter more fully explained, and which will be particularly pointed out and defined in the claim of this specification, for effecting automatically the dumping of the bucket on its arrival in a filled condition at its destination.

To enable those skilled in the art to which my invention relates to make and use the same, I will now proceed to more fully describe my improved automatic dump-bucket, referring by letters to the accompanying drawings, which form a part of this specification, and in which I have illustrated my invention carried out in that form in which I have so far successfully practiced it, and which is the best now known to me.

In the drawings, Figure 1 is a face view or an elevation of a dump-bucket embracing my invention. Fig. 2 is a side view or elevation of the same, embracing, also, a partial top view that shows a part of one side of the bucket and some of its attachments. Fig. 3 is a partial side and partial top view showing a modification of my invention. Fig. 4 is a similar view showing still another modification. Fig. 5 is a view similar to that half of Fig. 1 that shows the housing to which the bail or handle is attached, in section, but with a portion of the bail broken away to better show the catch-lever, and drawn on an enlarged scale, and with the parts in the position in which the bucket is free to oscillate or turn on its trunnions. Fig. 6 is a view similar to Fig. 5, except that the device for disengaging the bucket from the locking mechanism is shown in its normal position—*i. e.*, with its wedge-like cams resting in the lower ends of the slits or slots that extend downwardly some distance from the upper ends of the housings within which said device works at each side of the bucket.

At Fig. 1 I have shown the device for effecting the unlocking of the bucket from its handle in the position in which it would be immediately after having effected this purpose, while at Fig. 2 I have shown said device in the position in which it would appear when the bucket is just about descending onto the pile of coal, a contact with which operates to push up the said device and make it manipulate the catch mechanism of the bucket.

In both figures the same parts of the contrivance will be found designated by the same letters of reference.

A represents a metallic bucket of an approved pattern and substantially such as is usually employed in hoisting and conveying machines for handling coal, ores, &c., said bucket being suspended from its trunnions B by means of the usual bail or handle, C, which in the case shown is provided with locking devices composed of pivoted levers *d*, the lower ends of which are formed or provided with lug-like inward projections *e*, that engage with stops *f*², either applied to or formed on the sides of the bucket, in a manner and for the purpose well known. As usual, the bucket is provided with wheels *f f*, mounted in separating-stands *g g* in the usual manner to facilitate the movement of the bucket either filled or empty when it may be desired to have it travel on any surface.

H is a bail-like or loop-like device the vertical portions of which embrace the bucket laterally and are adapted to slide up and down to a given extent within the housings $h$ and in close proximity to the vertical sides of the bucket, and the bottom or horizontal portion of which lies in more or less close proximity to the bottom of the bucket, all substantially as shown, and so as to permit a given amount of movement up and down bodily of the said loop-like device, in a manner and for a purpose to be presently explained. The upper end of each of the legs or vertical portions of the device H is formed or provided with a cam or wedge shaped projection, $i$, which, when the device H depends in its lowermost or normal position on the bucket, lies a short distance below one of the inwardly-projecting lugs $e$ of the catches which lock the bail of the bucket in engagement with the stops on the sides of the said bucket, (see Fig. 2,) and the function and effect of these cam-like devices $i$ are to operate upon the lugs $e$ of the locking mechanism of the bucket and to force them out of engagement with the stops on the sides of the bucket, as shown at Fig. 1, to permit the dumping movement of the latter in discharging its contents.

The operation of my improved bucket will be readily understood, from what has already been said and from the drawings, to be as follows: The filled bucket, locked to its bail or handle by the means hereinbefore mentioned, or by any other substantially like it, and with the device H in the position seen at Fig. 6—that is, supported by contact of its wedge-shaped portions $i$ with the roots or lower ends of the slits or slots $s$ of the housings $h$—descends into the hold of a ship or onto a pile of coal other material in the usual manner, until the lower horizontal portion of the loop-like device H comes into contact with some portion of the topmost part of the pile of material, when, by the farther continued descent of the bucket, the loop-like device is naturally and necessarily forced upwardly relatively to the bucket, and this relative ascent of said loop-like device causes the cam-like projections $i$ $i$ at its upper ends to force out the catch devices $e$ $e$ of the bail or handle, all as clearly illustrated by the changed positions or conditions of the parts shown at Fig. 5, thus effectually unlocking the bail from the bucket, when, by the usual overbalance of the bucket on its trunnions, the contents of the bucket will be discharged by the oscillatory movement of the latter on its said trunnions, in a manner well understood. As soon as the bucket is hoisted or begins its ascent, the loop-like device will of course descend relatively to the bucket (or, in other words, will rest upon the pile of material by gravity while the bucket go up) until its cam-like devices $i$ $i$ shall have returned to their normal or original position, when the locking devices $e$ $e$ will again re-engage in the usual manner with the stops on the sides of the bucket as soon as the latter shall have righted itself or turned in the usual manner to its normal or original position ready for refilling.

It will be understood that by the use of substantially such a device as shown and described the dumping of the contents of the bucket must always occur after the bucket shall have reached the locality or level at which its contents will be discharged onto the pile without any material tumble or fall of the coal that might tend to break or otherwise injure it, and it will be seen that the means by which this desirable end is accomplished is not only perfectly automatic and infallible in its operation, but is simple of construction, exceedingly durable, and not liable to derangement in the rough usage to which the buckets of hoisting and conveying machines for handling rough material in large bulk are necessarily subjected.

Of course the details of construction of the contrivance shown may be more or less varied without changing its principle of construction, and the form and character of both the bucket and devices or mechanism by which it is locked to its bail or handle may be changed more or less without departing from the spirit of my invention, the gist of which lies in the combination, with the bucket, its bail, and the usual catch mechanism, of a device for automatically disengaging the bucket at each side from its bail or handle, so as to permit the bucket to dump only when such disengaging device and the bucket to which it is attached shall have descended nearly or quite to the level at which the top of the pile is, or at the surface onto which the contents of the bucket are to be dumped or emptied.

As a modification of the contrivance shown and hereinbefore described, the upper ends of the loop-like device H may have, instead of the cam-like devices $i$ $i$, simple rectangular lugs or lateral projections—such as seen at $s$ $s$ of Fig. 3, and also Fig. 4—and the disengaging-lugs $e$ $e$ of the bail may be arranged to interlock laterally with simple lugs projecting from the sides of the bucket, the whole constructed and operated as shown at Figs. 3 and 4, so that by the pushing up or ascent of the loop-like device H the projections $s$ will simply be forced above the level or locality of the projections $e$, so that the latter will be freed from restraint and the bucket permitted to rotate in the proper direction to discharge its contents, and so that after having ascended and righted itself the bucket will bring the lugs $s$ $s$ into the proper position to descend by gravity and resume their proper relationship to the lugs $e$ $e$, and thus effect the final and perfect engagement of the bucket with its bail or handle.

Having now so fully explained the construction and operation of my novel contrivance for automatically effecting the dumping of the bucket whenever the latter shall have arrived at the immediate locality of the pile on which its contents are to be discharged, what I claim as new, and desire to secure by Letters Patent, is—

In combination with the bucket, the bail or handle, and the mechanism located at each side of the bucket for locking it and the bail together and for permitting the disengagement of these parts, as usual, the device H, formed or provided with cam-like projections $i$, the whole arranged and operating together in substantially the manner and for the purposes hereinbefore set forth.

In witness whereof I have hereunto set my hand this 31st day of August, 1886.

ALEXANDER E. BROWN.

Witnesses:
E. T. SCOVILL,
CHAS. W. KELLY.